April 9, 1963 J. RABINOW 3,084,776
HYDRAULICALLY CUSHIONED POSITIVE COUPLING
Filed July 28, 1960 2 Sheets-Sheet 1
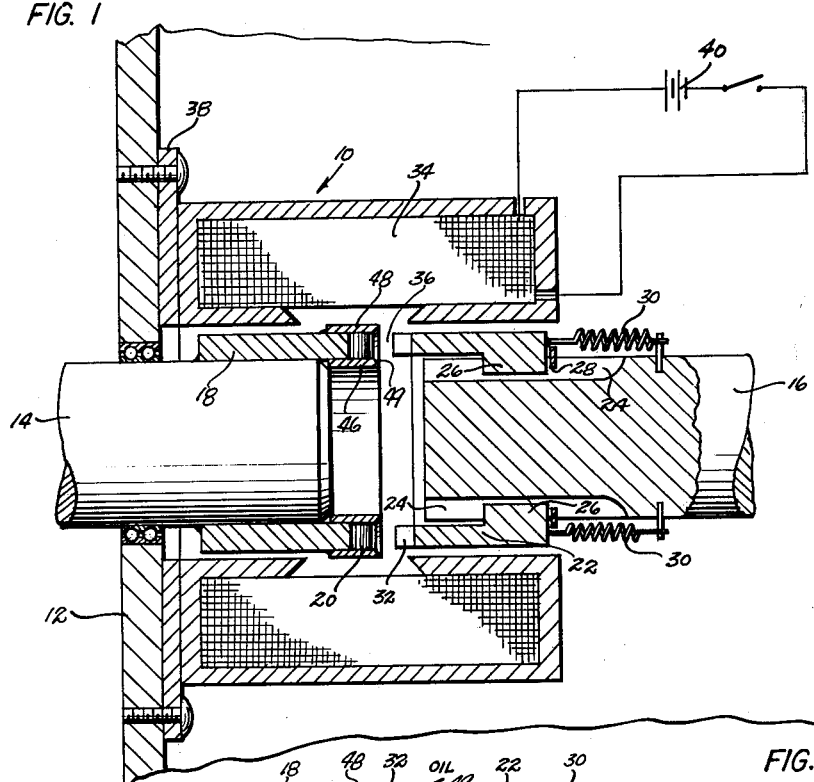
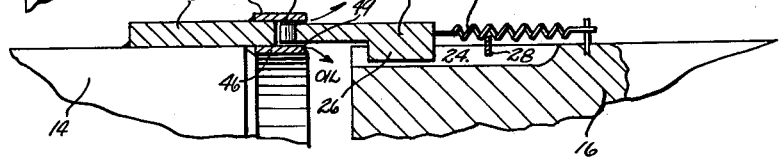
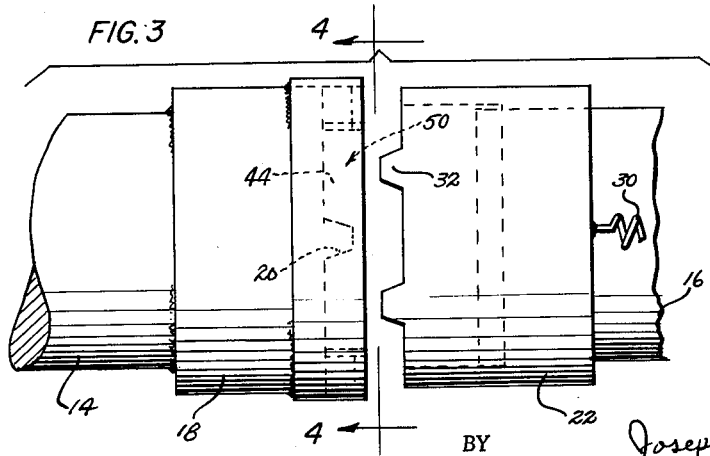
INVENTOR
Jacob Rabinow
BY Joseph A. Genovese
ATTORNEY April 9, 1963 J. RABINOW 3,084,776
HYDRAULICALLY CUSHIONED POSITIVE COUPLING
Filed July 28, 1960 2 Sheets-Sheet 2
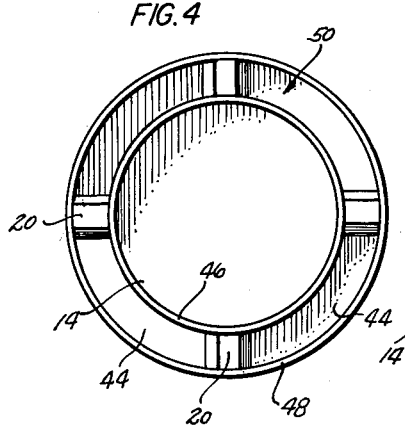
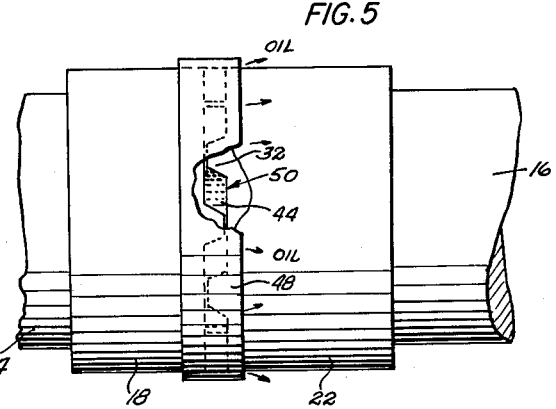
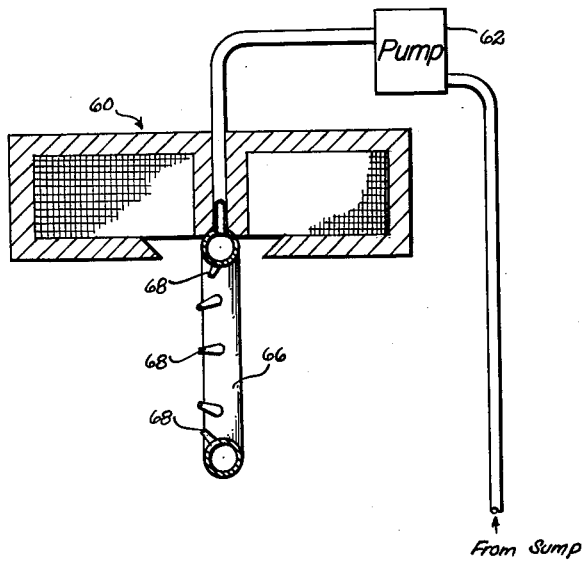
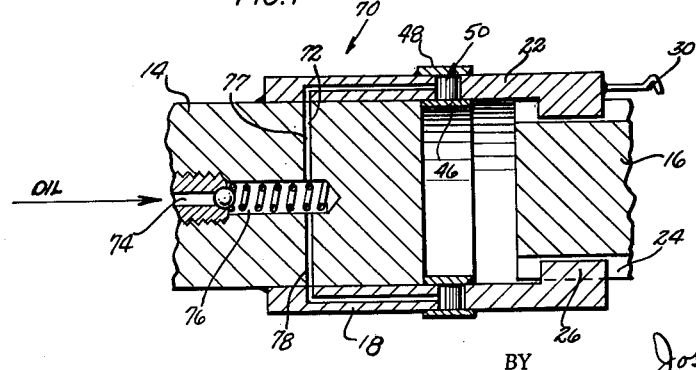
INVENTOR
Jacob Rabinow
BY Joseph A. Genovese
ATTORNEY

United States Patent Office
3,084,776
Patented Apr. 9, 1963

3,084,776
HYDRAULICALLY CUSHIONED POSITIVE
COUPLING
Jacob Rabinow, Takoma Park, Md., assignor to Rabinow
Engineering Co., Inc., Rockville, Md.
Filed July 28, 1960, Ser. No. 45,977
6 Claims. (Cl. 192—109)

This invention relates to couplings and particularly to positive couplings. Since the principles of my invention are equally well adaptable to couplings used as clutches or brakes, the succeeding description shall be restricted to the term "coupling." However, it is understood that the interchange between clutches and brakes is merely a matter of ultimate use and hence, this term is defined as including clutches and brakes.

A typical example of a coupling with which my invention may be used is one which has positive engaging means, such as teeth or groups of teeth, which are engaged or disengaged to establish or break a drive connection between a pair of parts.

The teeth of such couplings are subject to fatigue, wear and breakage, and they operate at a rather high noise level upon engagement. Accordingly, one of the objects of my invention is to materially prolong the life of positive couplings by attenuating the noise and impact loading between the coupling engaging elements. Considering the same problem from another standpoint, my invention hydraulically cushions the engagement of the elements.

Another object of the invention is to increase the tolerable loading of positive couplings so that the capacity of a given size coupling is materially increased.

One manner of achieving the above objectives which may be considered as a brief statement of my invention, is to confine a quantity of liquid in the region of the coupling elements and to arrange the confinement in such a way that the liquid is in a chamber having one or more traps, and some of the liquid is squeezed out of the traps as the elements approach and finally engage.

I am aware of the common use of oil to lubricate engaging teeth, and the use of oil in positive couplings for special purposes. For instance, the H. Sinclair Patents 2,876,878 and 2,892,524 disclose oil exerting a tangential drag on a coupling member for the ultimate purpose of reducing the light nuzzling contact of coupling teeth. However, my invention solves an entirely different problem. I believe that there would be a much greater use of positive couplings if the capacity thereof could be increased without resorting to special expensive metals for the teeth as is now done. I directly attenuate shock and noise by the fluid trapped between the coupling elements, and am not concerned with reducing light nuzzling contact, which does not exist in conventional couplings of the type with which my invention deals.

Positive engaging clutches containing meshing teeth suffer from the main difficulty that when the teeth engage very large stresses are produced in the teeth because of the inertia loads both of the clutch itself and of the connected load. These clutches, however, have many advantages such as small size, no slip, and ability to be designed to be either self-locking or not self-locking depending on the angle of the tooth faces. The main object of the invention therefore is to provide cushioning means built into the clutch mechanism itself by means of which the engagement of the teeth will be more gradual and high impact shocks avoided.

The confinement of liquid in a chamber containing at least one set of clutch elements is independent of the method used to supply the chamber with liquid. If the coupling has two sets of teeth, both sets may be fully or partially immersed in liquid so long as there are some means to confine a portion of the liquid in the immediate region of the tooth faces. This differs from simply providing a film of liquid on the teeth or operating the sets of teeth in an oil bath. The principal distinction is that my invention requires the liquid to function as a buffer in addition to a lubricant whereas a mere film of oil or total submersion in oil, which, without "confinement" as used herein, is tantamount to a mere film, has only the lubricating quality and will not function as a buffer except for the negligible thickness of the oil film.

In some applications, total submersion of the sets of teeth plus limited confinement of the liquid in the region of the sets of teeth, is sufficient. Different duty cycles, configurations and demands on a coupling dictate the advisability of applying a liquid in the confined region under pressure. Accordingly, my invention contemplates not only submersion of the coupling elements but also application of liquid under positive pressure into the chamber containing at least one of the sets of coupling elements.

Even though the principles of my invention may be practiced with numerous types and varieties of positive couplings, a magnetically operated tooth clutch is one embodiment which may benefit very highly.

A feature of the invention is that even though greater forces may be used in engaging and disengaging the coupling elements, resulting in much greater speeds of actuation, the noise level is maintained low.

Other objects and features of importance will become evident in following the description of the illustrated forms of the invention.

FIGURE 1 is a longitudinal sectional view of a coupling exemplifying the principles of the invention.

FIGURE 2 is a fragmentary sectional view showing the coupling elements in an engaged position.

FIGURE 3 is a side elevational view of a portion of the clutch in FIG. 1.

FIGURE 4 is a sectional view taken on the line 4—4 of FIG. 3.

FIGURE 5 is a side elevational view of a part of the coupling in FIG. 3, showing particularly the relative position of the coupling elements in the liquid chamber when the coupling is in the engaged position.

FIGURE 6 is a diagrammatic sectional view showing a modification of the coupling.

FIGURE 7 is a diagrammatic sectional view showing another modification of the coupling.

In the accompanying drawings, reference is first made to FIGURES 1–5 showing coupling 10 located in a housing 12 which contains a fluid, for instance oil. The coupling is composed of a first member 14 and a second member 16, member 14 being a shaft adapted to be turned by an external power source. Members 14 and 16 are partially or completely submersed in the fluid. Collar 18 is fixed to one end of shaft 14 and has one or more clutch elements at its outer edge. The elements are shown as a set of teeth 20 since these are common positive coupling elements. The second member 16 consists of a shaft coaxially arranged with member 14 and having a collar 22 axially movably connected therewith. Although collar 22 is axially movable, it is fixed against rotation relative to the member 16, and there are a number of ways of doing this such as having splines 24 in member 16 and keys 26 fixed to collar 22 and located in the splines. A stop ring 28 is in a groove in member 16, and it limits the axial motion of collar 22 in one direction. Resilient means, such as springs 30, are attached to collar 22 and to member 16 to return the collar 22 to a rest position against stop 28. The inner extremity of collar 22 has a coupling engaging element or a set of elements 32, for instance teeth, which are engagable with the set of teeth 20 to establish a drive connetcion between members 14 and 16.

It is evident that collar 22 may be actuated in a variety of known ways, one of which is by energizing the coil or coils of an electromagnet 34 or group of electromagnets concentrically mounted around the confronting ends of members 14 and 16. Regardless of the magnet configuration, flux gap 36 is across the sets of teeth 20 and 32.

The coupling is engaged by energizing the electromagnet which is connected to an external electric circuit 40 schematically shown in FIG. 1. Energization of the electromagnet causes collar 22 to be moved swiftly toward collar 18 to bring the sets 20 and 32 of teeth into engagement. When the electromagnet is de-energized the springs 30 return collar 22 to its rest position against stop 28.

The embodiment shown in FIGURES 1–5 provides a chamber 50 (FIGURES 4 and 5) for a quantity of liquid. The chamber is defined by a pair of cylindrical walls 46 and 47 secured to collar 18 on opposite sides of teeth 20. The outer edges of walls 46 and 48 protrude slightly beyond the extremities of the teeth, and these outer edges may have a slight bevel 49 (FIG. 1) to eliminate the possibility of teeth 32 striking a perpendicular surface, if there is small misalignment between teeth 20 and 32. The space between teeth 20 and the inner surfaces of walls 46 and 48 define individual traps 44 within chamber 50. Reasonable tolerances leaving a small clearance between the outer faces of teeth 32 and the inner surfaces of walls 46 and 48 are maintained so that when teeth 32 enter and begin to occupy chamber 50, the liquid trapped in the traps 44 must be discharged through the clearances. The result is that the liquid in the individual traps functions as a buffer to attenuate shocks, noise and impact loading of the teeth 20, 32 as their faces engage due to the asynchronous rotation of the two members 14, 16 and the relative axial and rotary motion of one member with respect to the other. I consider it a more practical place to have the walls 46, 48 on collar 18 since this collar does not move axially. However, they may be attached to collar 22 instead of collar 18, and the same cushioning effect achieved.

FIGURE 6 discloses a feature which can be added to coupling 10. The major distinction between the coupling 60 of FIG. 6 and that of FIG. 1 is that the coupling 60 is not submersed or is only partially submerged in liquid. Instead, pump 62 is connected with a source of liquid, e.g. a sump (not shown) and conducts the liquid under pressure to the manifold 66 in the form of a ring concentric with members 14 and 16. The manifold has a number of discharge orifices which squirt liquid under pressure into traps 44. This is merely another way to practice the invention and may be used in situations where it is not desirable to have the entire clutch immersed in oil. Further, the pump and manifold system may be used even in those cases where the coupling is submersed in oil, as a means to assure a copious supply of liquid in traps 44 at all times. Cavitation and/or centrifugal forces may strip the traps 44 of a sufficient oil supply in the submersed embodiments whereas supplemental oil is assured at all times by using a system such as shown in FIG. 6. This also holds true of the system shown in FIG. 7.

Coupling 70 (FIG. 7) is similar to couplings 10 and 60, but the distinction is that the traps 44 are supplied with oil under pressure by way of a pressure source (not shown) and a passageway network 72. A check valve 74 is the main passage 76, the latter being a longitudinal bore in member 14. Branch passages 77 and 78 extend from the bore and continue longitudinally through the side wall of collar 18. Discharge from the passages 77 and 76 is directly into the traps 44.

Various other forms and modifications of the invention may be made without departing from the scope of the following claims.

I claim:
1. In a tooth coupling, a first rotary member, a second rotary member coaxial with said first member, means mounting said second member for axial movement toward and away from said first member, means for axially moving said second member into engagement with said first member, said members having a first set and an entrant set of teeth on their respective confronting ends, means defining a liquid chamber at one end of one of said members, one of said sets of teeth being located in said chamber with their teeth spaced a distance appreciably greater than the length of the entrant teeth measured from the front to rear faces at the bottom of a tooth plus normal tooth-clearance tolerance to cooperate with portions of the chamber surfaces in defining liquid traps whose lengths measured along a circumferential line are appreciably in excess of the length of said entrant teeth which enter said traps so that when said sets of teeth are engaged by axial movement of said second member the impact of the engaging faces of said sets of teeth caused by the difference in rotational speeds of said members is attenuated by the compression of the liquid in said traps.

2. The tooth coupling of claim 1 wherein said liquid chamber defining means comprise a pair of concentric spaced walls, and the teeth in said chamber being located in the space between said pairs of walls.

3. In a tooth coupling having one rotary member adapted to be connected to a load and a coaxial rotary member adapted to be connected with a power source, means to axially move one member toward the other to engage said members, a set of teeth on each of the confronting ends of said members, said teeth receiving the impact due to the inertial loads of said members and the connected load when said sets of teeth engage as said members are rotating asynchronously, means to attentuate said impact including an annular liquid chamber on said one member, one of said sets of teeth located in said chamber, circumferential liquid traps at the inner end of said chamber, each trap occupied by at least one tooth of the set on said other member and in addition having a liquid space between the adjacent faces of confronting teeth of said sets in which liquid is placed under compression due to the rotary motion of one member with respect to the other, thereby arresting the shock of the teeth as they engage.

4. In a hydraulically cushioned tooth coupling having a first coupling member rotatable about an axis, a second rotary coupling member coaxial with said first member, and means for axially moving one of said members toward the other member to engage said members when said members are rotating asynchronously; means including a pair of concentric walls on one of said members defining a liquid chamber, a part of the other of said members moving inwardly of said chamber when said members are being engaged, the width of said chamber between confronting surfaces of the walls thereof being sufficiently greater than the width of said part of the member which moves inwardly of said chamber to define an annular discharge passageway therebetween for the liquid trapped in said chamber so that the liquid of the chamber leaves the chamber by flowing over the inner surfaces of said walls in a direction opposite to the direction of said axial movement of said member as said members are engaged, teeth on the confronting ends of said members, the teeth on one member being in said chamber and circumferentially spaced distances such that when the teeth of both members are being engaged there is still sufficient spacing between adjacent teeth in a circumferential direction to define circumferentially spaced liquid traps with the liquid in said traps being compressed due to the relative rotation of said members.

5. The hydraulically cushioned coupling of claim 4, and a liquid pressure pump, means connected with said pump to conduct liquid under pressure from said pump into said chamber and said traps prior to and at least during a portion of the time that said coupling members are being engaged and disengaged, and electrically operative means to produce said axial movement of one of said coupling members.

6. In a hydraulically cushioned and fast engaging coupling having a first member rotatable about an axis of rotation, a second rotary member coaxial therewith, means to axially move said second member toward said first member for engaging said rotary members, a pair of spaced concentric walls on said first member defining an annular liquid chamber with an open end confronting said second member, teeth at the inner part of said chamber and mating teeth on the adjacent end of said second member, said confronting end of said second member and its teeth moving inwardly of said chamber when said second member is axially moved in a direction to engage said teeth, the teeth on one member being spaced apart distances greater than the length of the teeth of the other member measured from the front to rear faces thereof at the bottom of the teeth to define circumferentially arranged traps between pairs of teeth, the liquid confined in said traps buffering the engagement of said teeth caused by the rotational motion of one of said members to thereby attenuate the impact of the teeth of said members.

References Cited in the file of this patent

UNITED STATES PATENTS

| | | |
|---|---|---|
| 798,188 | Kehoe | Aug. 29, 1905 |
| 1,830,744 | Logue | Nov. 3, 1931 |
| 2,062,930 | Pritchard | Dec. 1, 1936 |
| 2,140,216 | Wissman | Dec. 13, 1938 |
| 2,382,765 | Zahodiakin | Aug. 14, 1945 |